US012164980B2

(12) United States Patent
Doerr et al.

(10) Patent No.: US 12,164,980 B2
(45) Date of Patent: Dec. 10, 2024

(54) INITIATING OPERATIONS FOR APPLICATIONS VIA COMMUNICATION BRIDGES

(71) Applicant: HERE ENTERPRISE INC., New York, NY (US)

(72) Inventors: Chuck Doerr, New York, NY (US); Wenjun Che, New York, NY (US); Ricardo de Pena, New York, NY (US)

(73) Assignee: Here Enterprise Inc., New York, NY (US)

( * ) Notice: Subject to any disclaimer, the term of this patent is extended or adjusted under 35 U.S.C. 154(b) by 95 days.

(21) Appl. No.: 17/697,782

(22) Filed: Mar. 17, 2022

(65) Prior Publication Data

US 2023/0297448 A1 Sep. 21, 2023

(51) Int. Cl.
G06F 9/54 (2006.01)
(52) U.S. Cl.
CPC .................... *G06F 9/547* (2013.01)
(58) Field of Classification Search
CPC ............ G06F 9/54; G06F 9/541; G06F 9/547
See application file for complete search history.

(56) References Cited

U.S. PATENT DOCUMENTS

| 9,934,019 | B1* | 4/2018 | Gebhard | G06F 9/541 |
| 10,148,640 | B2* | 12/2018 | Desai | H04L 63/10 |
| 10,261,845 | B2* | 4/2019 | Meijer | G06F 9/547 |
| 2015/0244787 | A1 | 8/2015 | Fausak et al. | |
| 2018/0165137 | A1* | 6/2018 | Agarwal | G06F 9/542 |
| 2020/0036774 | A1* | 1/2020 | Tada | G06F 9/541 |
| 2020/0099738 | A1* | 3/2020 | Borkar | H04L 67/63 |
| 2021/0126984 | A1* | 4/2021 | Parekh | A63F 13/355 |
| 2022/0391266 | A1* | 12/2022 | Eatough | G06F 9/541 |

FOREIGN PATENT DOCUMENTS

EP 3051417 A1 8/2016
WO 2021130500 A1 7/2021

OTHER PUBLICATIONS

The International Search Report and Written Opinion for PCT Application No. PCT/US2023/011872 mailed May 8, 2023.

* cited by examiner

*Primary Examiner* — Brian W Wathen
(74) *Attorney, Agent, or Firm* — Womble Bond Dickinson (US) LLP

(57) ABSTRACT

A method of communicating between applications is provided. The method includes establishing a communication bridge between a first application and a second application. The first application is located within a first computing device and the second application is located within a second computing device. The communication bridge comprises a set of communication channels. Each communication channel is associated with an application programing interface (API) function of the first application. The method also includes receiving, from the second application, a first request for the first application to perform a first operation. The method further includes providing the first request to the first application. The method further includes receiving a first result of the first operation from the first application. The method further includes providing the first result of the first operation to the second application.

20 Claims, 5 Drawing Sheets

INITIATING OPERATIONS FOR APPLICATIONS VIA COMMUNICATION BRIDGES

BACKGROUND

An application may operate or execute on a computing device to perform various functions, operations, method, etc. For example, an application may allow a user to place an order, send a message, debit money from an account, send an email, etc. Different applications may perform different operations or functions. For example, a first application may be used to place an order and a second application may be used to update an inventory database.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

As discussed above, an application may operate or execute on a computing device to perform various functions, operations, method, etc. Some applications may require particular environments to operate properly (e.g., may require specific devices, networks, services, etc.). Configuring or setting up an application and/or a computing device to operate within an environment may be a time consuming, complicated, and/or expensive process/operation. For example, a desktop computer may be configured to run an application within a particular environment. It may be very difficult or impossible for a use the same application on a second device (e.g., a smartphone, a tablet computer). For example, it may be costly, time consuming, complicated, etc., to setup a second device with the same application. In another example, the second device may not be capable of executing the same application (e.g., the second device may not have enough processing/computing power).

The embodiments, implementations, and/or examples described herein provide a communication bridge that may allow a first application to perform operations using a second application. The communication bridge may allow the first application on a first device (e.g., a mobile computing device) to request a second application on a second device (e.g., a desktop computer, a server computer, etc.) to perform operations via API function calls. The first application may also receive the results of the operations via the communication bridge. This may allow the first application to control the second application or cause the second application to perform functions that are requested by a user of the first device. This allows the first device to perform the operations of the second application without installing the second application on the first device and/or without configuring the first device/application to work within the environment used by the second application.

Figure 1:
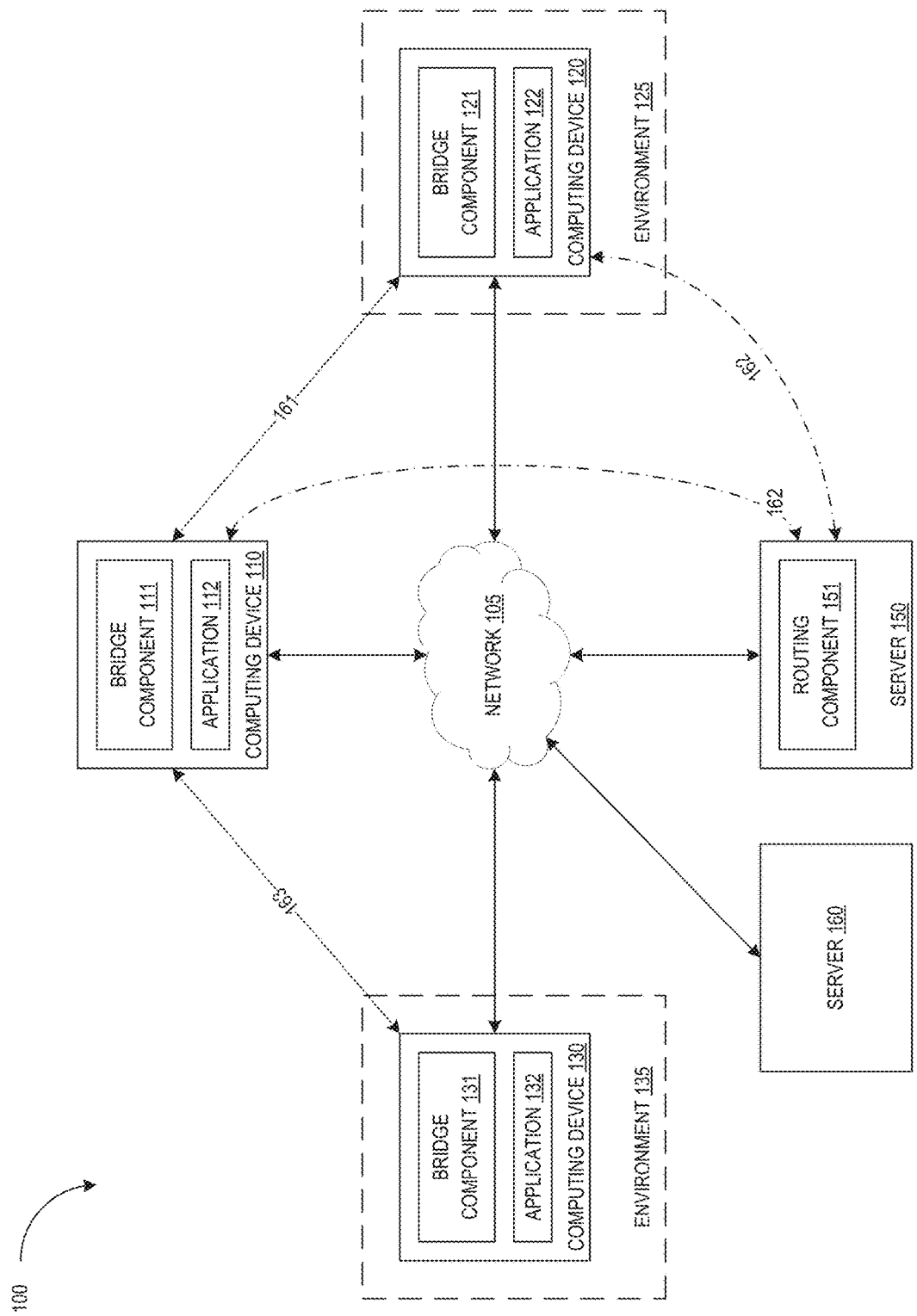
FIG. 1 is a block diagram that illustrates an example of a system architecture, in accordance with some embodiments of the present disclosure.

FIG. 1 is a block diagram that illustrates an example of a system architecture 100, in accordance with some embodiments of the present disclosure. The system architecture 100 may include a computing device 110, computing device 120, computing device 130, server 150, server 160, and network 105. Although three computing devices are illustrated in FIG. 1, there may be more or fewer computing devices in other embodiments of the system architecture 100. Network 105 may be a public network (e.g., the internet), a private network (e.g., a local area network (LAN) or wide area network (WAN)), or a combination thereof. In various embodiments, the network 105 may include a wired or a wireless infrastructure, such as a WiFi' hotspot connected with the network 105, and/or a wireless carrier system that can be implemented using various data processing equipment, communication towers (e.g. cell towers), etc. In embodiments, the network 105 may utilize any protocol or combination of protocols for communicating data between the computing device 110, computing device 120, computing device 130, server 150 and server 160, such as Ethernet, internet protocol (IP), etc. The system architecture 100 may be a cloud-based service, on an organization's network, a stand-alone on a desktop, or at any other location connectable to one or more computing devices, such as computing device 110.

Each of the computing devices 110, 120, and 130 may include hardware such as a processing device, memory, and other hardware devices (e.g., sound card, video card, etc.) (not shown). Similarly, each of server 150 and server 160 may include hardware such as processing devices, and respective memories, and other respective hardware devices (e.g., sound card, video card, etc.) (not shown). The processing devices, and the memories may be any one or combination of processing devices and memories discussed below with respect to FIG. 5. In an illustrative example, processing devices may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing devices may also include one or more special-purpose processing devices such as an application specific integrated circuit (ASIC), a field programmable gate array (FPGA), a digital signal processor (DSP), network processor, or the like.

Each of the computing devices 110, 120, and 130, and servers 150 and 160 may include any suitable type of device or machine that has one or more processing devices including, for example, server computers, desktop computers, laptop computers, tablet computers, smartphones, set-top boxes, etc. In some examples, a computing device may comprise a single machine, virtual machines running on one or more machines, or may include multiple interconnected real or virtual machines (e.g., multiple nodes in a cluster). The computing devices 110, 120, and 130, and/or servers 150 and 160 may be implemented by a common entity or may be implemented by different entities. For example, computing device 110 may be operated by a first entity, computing device 120 may be operated by a second entity, computing device 130 may be operated by a third entity, and server 150 may be operated by a fourth entity.

Application 112 is located on computing device 110. Similarly, application 122 is located on computing device 120. Application 122 and computing device 120 are located within environment 125. The environment 125 may include devices (e.g., server computers, peripheral devices, computing devices, etc.), software, networks, etc., that are used by the application 122. For example, special servers and network equipment may be used in the environment 125 to allow the application 122 to perform or operate correctly. In addition, application 132 is located on computing device 130. Application 132 and computing device 130 are located within environment 135. The environment 135 may include devices (e.g., server computers, peripheral devices, computing devices, etc.), software, networks, etc., that are used by the application 132. For example, special servers and network equipment may be used in the environment 135 to allow the application 132 to perform or operate correctly. The environments 125 and 135 may be referred to as operating environments, computing environments, system environments, network environments.

As discussed above, applications 122 and application 132 may not be able to operate or execute properly (e.g., perform various functions) outside of their respective environments 125 and 135. It may be difficult, expensive, time-consuming, etc., to setup additional applications within the environments 125 and 135 and/or to configure an application to work outside of the environments 125 and 135. For example, the computing device 110 may be a mobile computing device (e.g., a smartphone, a tablet computer, etc.) that is not configured to working within the environments 125 and 135. The computing device 110 may be unable to execute application 122. For example, the computing device 110 may be outside of the environments 125 and 135 which prevent the application 122 from executing application 122. In another example, the computing device 110 may not have the computing or storage resources to execute application 122.

A user of application computing device 110 may still want to use application 122 to perform various operations (e.g., retrieve or read messages, respond to messages, etc.) even though they are not located near computing device 120. For example, computing device 120 (e.g., a desktop computer) may be located in the user's office and the user may be out of the office while carrying computing device 120 (e.g., a smartphone). The user may want to perform one or more operations (e.g., send messages, place orders, update inventory, etc.) while the user is out of the office.

Generally, the computing device 110 should also execute application 122 in order to perform the operations of application 122. However, setting up or configuring the computing device 110 to also execute application 122 may be impossible or may be time consuming, complicated, and/or expensive. Because it may be impossible or difficult to setup or configure the computing device 110 to execute application 122, a user may not be able to perform the operations of application 122 is the user is not within the environment 125.

The embodiments, implementations, and/or examples described herein provide a communication bridge that may allow application 112 to perform operations using application 122 by requesting these operations from application 122 via the communication bridge 161. The application 112 may receive the results of the operations performed by application 122 and may present, display, etc., the results to a user. This may allow application 112 to control the application 122 or cause the application 122 to perform functions that are requested by a user of the computing device 110 (e.g., a smartphone). Thus, computing device 110 may essentially perform the operations of application 122 without installing the application 122 on the computing device 110 and/or without configuring the computing device 110 to work within the environment 125.

In one embodiment, the bridge component 111 may determine that a communication bridge (e.g., communication bridge 161 or 162 should be established between application 112 and application 122. As discussed above, the application 112 is within environment 115 (e.g., a first environment, a computing environment, an infrastructure, etc.) and application 122 is within a second environment 125 (e.g., a second environment, a computing environment, an infrastructure, etc.).

In one embodiment, the bridge component 111 may determine that the communication bridge between application 112 and application 122 should be established based on user input. For example, the bridge component 111 may receive user input (or some other input/message) indicating that the communication bridge should be established between application 112 and application 122.

In one embodiment, the bridge component 111 may transmit a message, a link (e.g., a uniform resource link (URL)), an identifier (e.g., a uniform resource identifier (URI)), etc., to the computing device 120. For example, the bridge component 111 may transmit a message that includes a link to the computing device 120. The message may indicate that the communication bridge should be established between application 112 and application 122. When the computing device 120 receives the message, the bridge component 121 may activate, select, click, etc., the link to establish communication bridge.

In one embodiment, the bridge component 121 may determine that the communication bridge between application 112 and application 122 should be established based on a message received from another computing device (e.g., computing device 120 or 130). For example, the bridge component 121 may a message that includes a link from bridge component 111. The bridge component 121 may determine that a communication bridge should be established based on the message.

In one embodiment, the bridge component 121 may establish a communication bridge (e.g., communication bridge 161) based on an authentication process. For example, the application 122 may display an authentication credential or token, such as a barcode, a quick response (QR) code, a code (e . . . , a number), an alphanumeric string, etc. The authentication credential may be obtained by bridge component 111 and the bridge component 111 may verify the authentication credential with the bridge component 121.

In one embodiment, bridge component 111 may establish the communication bridge between application 112 and application 122. The communication bridge between application 112 and application 122 may be a set, group, collections, etc., of communication channels between the application 112 and the application 122. In some embodiments, the communication channels may be logical channels. For example, the communication channels may be logical groups of data channels. In other embodiments, the communication channels may also be physical channels. For example, each communication channel may be a different IP address and/or port number.

In one embodiment, each communication channel may be associated with an application programming interface (API)

function of application 122. For example, application 122 may be associated with a set of API functions (e.g., one or more function calls, remote procedure calls (RPCs), etc.). The API functions may be provided by the application 122 to allow for various operations, functions, actions, methods, etc., to be performed. For example, an API function may be used to cause application 122 to perform a particular action (e.g., add a user, place an order, read data from a storage location, write data to a storage location, etc.). Each communication channel may be associated with one or more API functions. Associating a communication channel with one or more API functions may allow the associated communication channel to be used to cause applications 122 and 132 to perform particular operations, actions, etc.

In one embodiment, the communication bridge 161 (illustrated by the dotted line) may be a direct network connection established between computing devices 110 and 120, where applications 112 and 122 are located, respectively. A direct network connection may be a connection between two devices where the two devices are able to address or communicate with each other by using internet protocol (IP) addresses, hostnames (e.g., a domain name server (DNS) name), or other network identifiers.

In another embodiment, the communication bridge may be an indirect network connection established between computing devices 110 and 120. An indirect network connection may be a connection that is routed through an intermediary device, such as server 150. For example, an indirection connection may be used when security and/or network protocols (e.g., ports are blocked, network address translation (NAT) prevents packets from reaching device, etc.) in one or more of the environments 115 and 125 will not allow computing devices 110 and 120 to communicate with each other based on IP address, hostnames, etc. An indirect connection may include two (or more) network connections. For example, communication bridge 162 may include an indirect connection may include a first network connection between computing device 110 (e.g., application 112) and server 150, and may also include a second network connection between server 150 and computing device 120 (e.g., application 122).

In one embodiment, the bridge component 111 may determine that the application 112 is requesting the application 122 to perform one or more operations (e.g., to perform an action, function, etc.). For example, the application 112 may receive input (e.g., user input from a user) via a user interface of the application 112 (e.g., via a graphical user interface (GUI), a command line interface (CLI), etc.). The user input may be received by the application 112 when a user interface element (e.g., a button, link, menu, etc.) of the user interface is activated, selected, clicked, etc., by the user. The application 112 may indicate to the bridge component 111 that a specific operation (e.g., function) was requested. For example, the application 112 may provide an identifier (e.g., a number, an alphanumeric string, etc.) of the user interface element (that was activated by the user) to the bridge component 111. In another example, the application 112 may provide a name for the specific operation (that was requested) to the bridge component 111.

In one embodiment, the bridge component 111 may identify which communication channel of the communication bridge 161 should be used (to transmit the request) based on the one or more operations that were requested by the application 112. For example, the bridge component 111 may have a library, configuration file, or settings/parameters that indicates which operations are associated with which communication channels. Based on the identifier or name of the operation provided by the application 112, the bridge component 111 may select, identify, determine, etc., the appropriate communication channel of the communication bridge 161.

In one embodiment, the bridge component 111 may transmit a request to the first application to perform the one or more operations requested by the application 112 (e.g., requested by a user). For example, the bridge component 111 may transmit a message indicating the one or more operations that are requested by the application 112. The bridge component 111 may also transmit parameters or information that may be used to perform the operation. For example, the bridge component 111 may transmit information and/or data that are needed by the application 122 to perform the requested operation. The bridge component 111 may transmit the request using a specific communication channel of the communication bridge 161 (e.g., a communication channel identified based on the operation). For example, each channel of the communication bridge 161 may be associated with an operation (e.g., a function, action, etc.) and/or an API function of the application 122. The bridge component 111 may transmit the request using the communication channel that is associated with the requested operation or is associated with the API function which may cause the application 122 to perform the requested operation.

In one embodiment, bridge component 121 may receive the request to perform one or more operations via the communication channel of the communication bridge 161 that was identified by the bridge component 111. For example, bridge component 121 may receive a message from the bridge component 111 and/or application 112. The message may indicate one or more operations for the application 122 to perform. The message may also include parameters, data, information, etc., that may be used by application 122 to perform the application.

In one embodiment, the bridge component 121 may provide the request to the application 122 so that the application 122 can perform the one or more operations requested by application 112. For example, the bridge component 121 may receive the request (from application 112) to perform one or more operations. The bridge component 122 may identify one or more API functions of the application 122 based on the request. For example, each communication channel may be associated with one or more API functions and the bridge component 122 may identify or determine the API functions associated with the communication channel where the request from application 112 was received. The bridge component 121 may also call, invoke, execute, etc., one or more API functions of the application 122, to cause the application 122 to perform the one or more requested operations.

In one embodiment, the application 122 may communicate with server 160 (e.g., an application server) to perform an operation requested by application 112. For example, the application 122 may transmit data to the server 160 for processing. In another example, the application 122 may request the server 160 to perform other operations (e.g., to credit an account, to update an inventory database, to retrieve/send a message, etc.). The application 112 may not communicate with the server 160. For example, the application 112 is not in the environment 125 so the application 112 may be unable to communicate data with the server 160. In another example, the application 112 may be unable to communicate directly with the server 160 because the server 160 may not be setup or configured to communicate with the application 112.

In one embodiment, the bridge component 121 may receive one or more results of the one or more operations performed by the application 122. For example, the API functions that were executed, called, etc., may return one or more results to the bridge component 121. A result may include various data related to the one or more operations performed by the application 122. For example, a result may indicate whether an operation was performed successfully. In another example, a result may also indicate whether one or more errors occurred when performing an operation. In a further example, a result may also include data obtained by the operation. For example, the result may include the content of a message retrieved by the application 122.

In one embodiment, the application 112 may request the application 122 to perform additional operations via the communication bridge 161. For example, the bridge component 111 may transmit additional requests to perform additional operations via another communication channel of the communication bridge 161. The bridge component 121 may receive those additional request and may execute (e.g., invoke, call, etc.) additional APIs of the application 122. The application 122 may provide results of the additional operations to the bridge component 121 and the bridge component 121 may transmit those results to the bridge component 111, which will provide the results to the application 112.

In one embodiment, the bridge component 121 may provide the result of an operation to the application 112 via the communication bridge 161. For example, the bridge component 121 may transmit the result of the operation to the bridge component 111 via the communication bridge 161. The bridge component 111 may receive the result and may provide the result to the application 112.

The bridge component 131 may also perform operations similar to the operations described above with respect to bridge component 121. For example, the bridge component 131 may establish another communication bridge 163 between application 112 and application 132. Application 132 may be on computing device 130 (e.g., a third computing device) which is located in environment 135 (e.g., a third environment). The bridge component 111 may determine that the application 112 (or another application on the device 110) is requesting the application 132 to perform an operation. The bridge component 111 may transmit the request to perform the operation to application 132 via a communication channel of the communication bridge 163. The bridge component 131 may receive the request and may execute (e.g., call or invoke) one or more APIs of the application 132. The application 132 may provide a result of the operation to the bridge component 131 and the bridge component 131 may transmit the result to the bridge component 111. The bridge component 111 may then provide the result to the application 112.

Although FIG. 1 depicts high-level components of an illustrative example of a system architecture 100, one skilled in the art will appreciate that other architectures for a system architecture 100 are possible, and that the implementation of a computer system utilizing examples of the disclosure are not necessarily limited to the specific architecture depicted by FIG. 1. For example, different numbers and/or configurations of communication bridges may be used in other embodiments. For example, multiple bridges may be established between application 112 and multiple applications on computing device 120 (not illustrated in FIG. 1).

Figure 2:
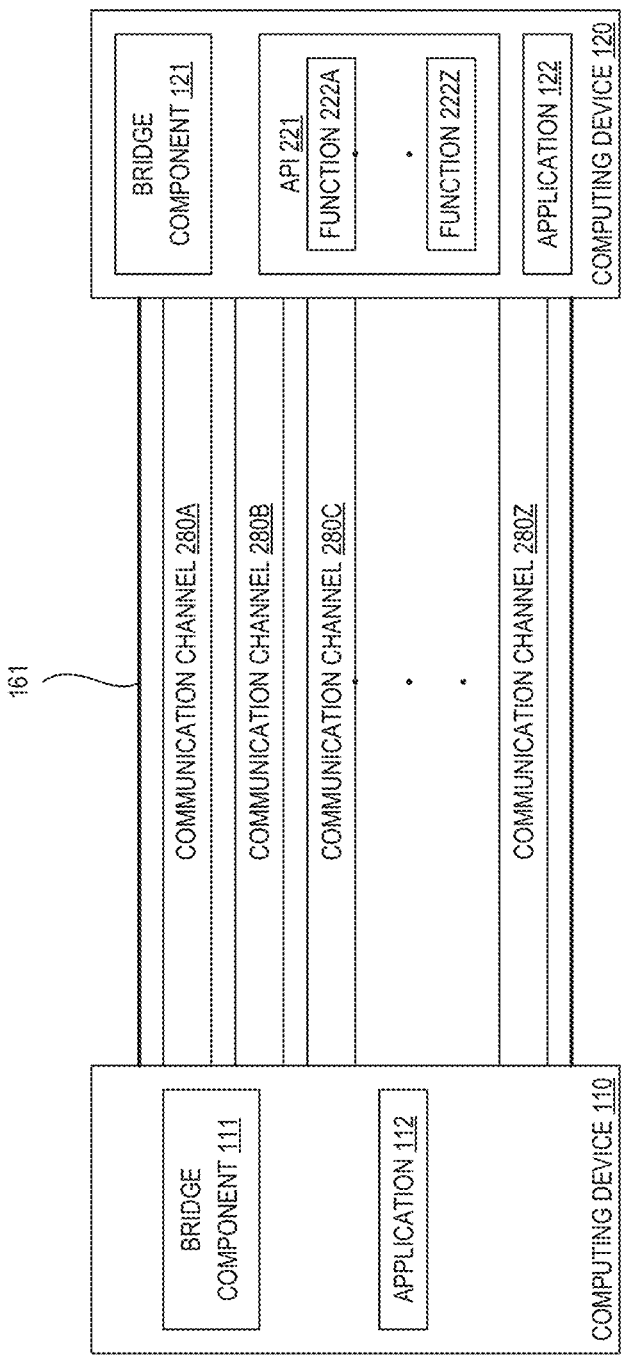
FIG. 2 is a diagram that illustrates an example communication bridge, in accordance with some embodiments of the present disclosure.

FIG. 2 is a diagram that illustrates an example communication bridge 161, in accordance with some embodiments of the present disclosure. As discussed above, computing device 110 may be located within a first environment (e.g., environment 115) and computing device 120 may be located within a second environment (e.g., environment 125).

Application 122 may be associated with API 221. The API 221 may be type of communication and/or software interface that allows other applications to communicate with application 122 and/or to cause application 122 to perform various operations, functions, actions, etc. The API 221 includes one or more API functions 222A through 222Z. Each API function 222A through 222Z may be invoked, called (e.g., via a RPC), etc., to cause the application 112 to perform a function/operation.

The communication bridge 161 may include a set, a group, etc., of communication channels, as discussed above. For example, the communication bridge 161 includes communication channels 280A through 280Z, as illustrated in FIG. 2. Each of the communication channels 280A through 280Z may be associated with one or more of the API functions 222A through 222Z. For example, a communication channel 280A may be associated with API functions 222A and 222B.

In one embodiment, each communication channel may also be associated with an operation that can be performed by application 122. For example, the application 122 may be able to perform a variety of operations (e.g., send a message, receive a message, write data to a storage device, etc.). Because each communication channel may be associated with an operation the bridge component 121 and/or the application 122 may be able to identify which operation has been requested by the application 112, based on which communication channel As discussed above, a communication channel of the communication bridge 161 may be used to transmits a request (from the application 112) to the application 122 to cause the application 122 to perform an operation. In one embodiment, the result of the requested operation may be transmitted by the bridge component 121 and received by the bridge component 111 via the same communication channel. In another embodiment, the result of the requested operation may be transmitted by the bridge component 121 and received by the bridge component 111 via another communication channel of the communication bridge 161.

Figure 3:
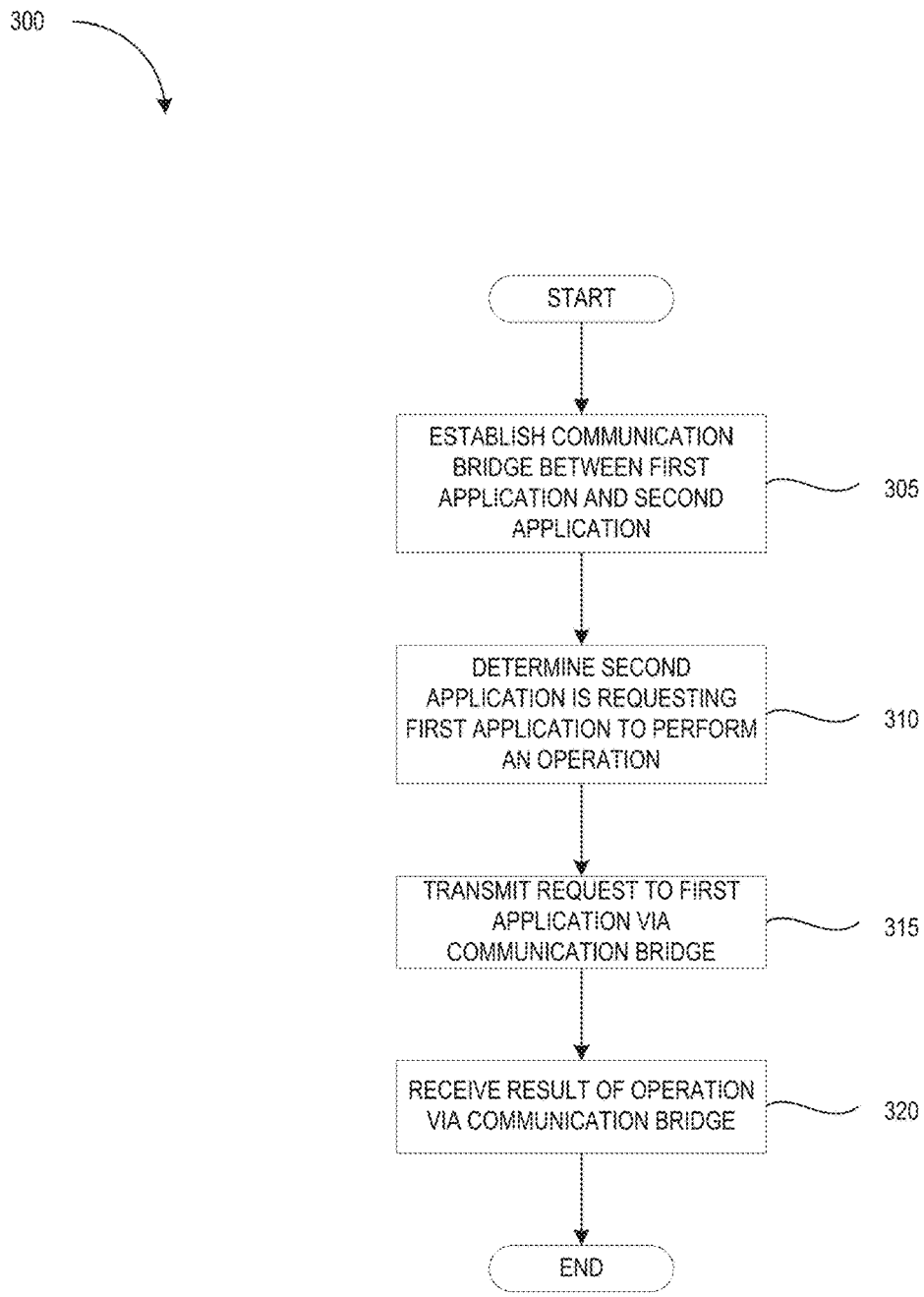
FIG. 3 is a flow diagram of a method to request an application to perform one or more operations, in accordance with some embodiments of the present disclosure.

FIG. 3 is a flow diagram of a method 300 to request an application to perform one or more operations, in accordance with some embodiments of the present disclosure. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof on the various described devices (e.g., client device 110 of FIG. 1). In some embodiments, at least a portion of method 300 may be performed by a bridge component (e.g., bridge component 111 illustrated in FIG. 1).

With reference to FIG. 3, method 300 illustrates example functions used by various embodiments. Although specific function blocks (e.g., operations) are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 305 where the processing logic establishes a communication bridge between a first application and a second application. As discussed above, the first and second applications may be located on different computing devices and/or in different environments (e.g., different computing environments). At block 310, the processing logic may determine that the second application is requesting the first application to perform an operation. For example, the second application may receive user input requesting the first application to perform the operation.

At block 315, the processing logic may transmit a request to the first application via a communication channel of the communication bridge. The communication channel may be identified or selected based on the requested operation. At block 320, the processing logic may receive the results of the operation from the first application via the communication bridge. For example, after the first application performs the operation, the first application may transmit the results of the operation via the communication bridge.

Figure 4:
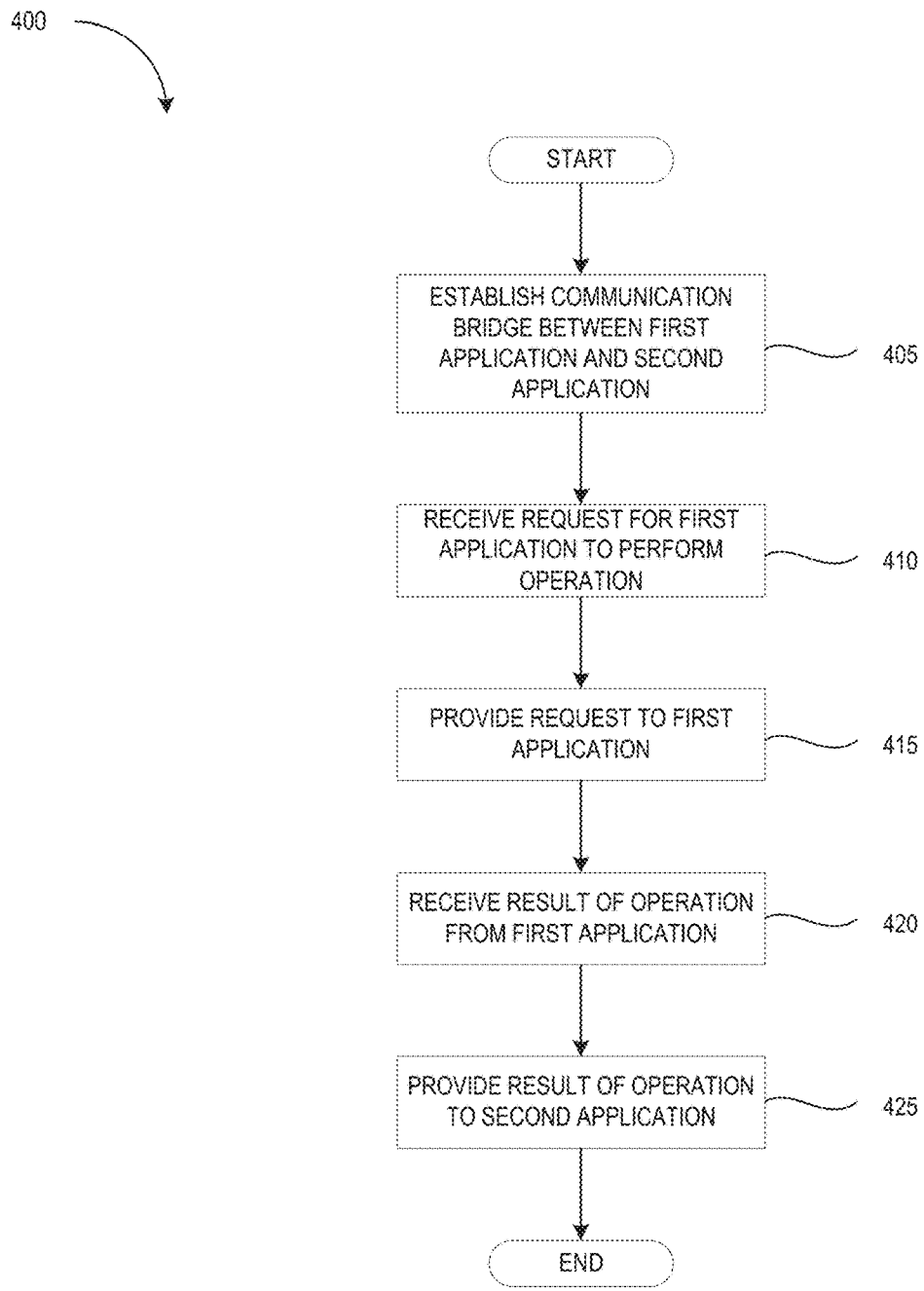
FIG. 4 is a flow diagram of a method to communicate data between applications, in accordance with some embodiments of the present disclosure.

FIG. 4 is a flow diagram of a method 400 to communicate data between applications, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof on the various described devices (e.g., client device 110 of FIG. 1). In some embodiments, at least a portion of method 400 may be performed by a bridge component (e.g., bridge components 121 and 131 illustrated in FIG. 1).

With reference to FIG. 4, method 400 illustrates example functions used by various embodiments. Although specific function blocks (e.g., operations) are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 405 where the processing logic establishes a communication bridge between a first application and a second application. As discussed above, the first and second applications may be located on different computing devices and/or in different environments (e.g., different computing environments). At block 410, the processing logic may receive a request from the second application requesting the first application to perform an operation. The request may be received via a communication channel of the communication bridge.

At block 415, the processing logic may provide the request to the first application. For example, the processing logic may identify an API function based on the communication channel and may execute (e.g., invoke, call, etc.) the API function. At block 420, the processing logic may receive the result of the operation from the first application. At block 425, the processing logic may provide the result of the operation to the second application. For example, the processing logic may transmit the result of the operation to the second application via the communication bridge.

Figure 5:
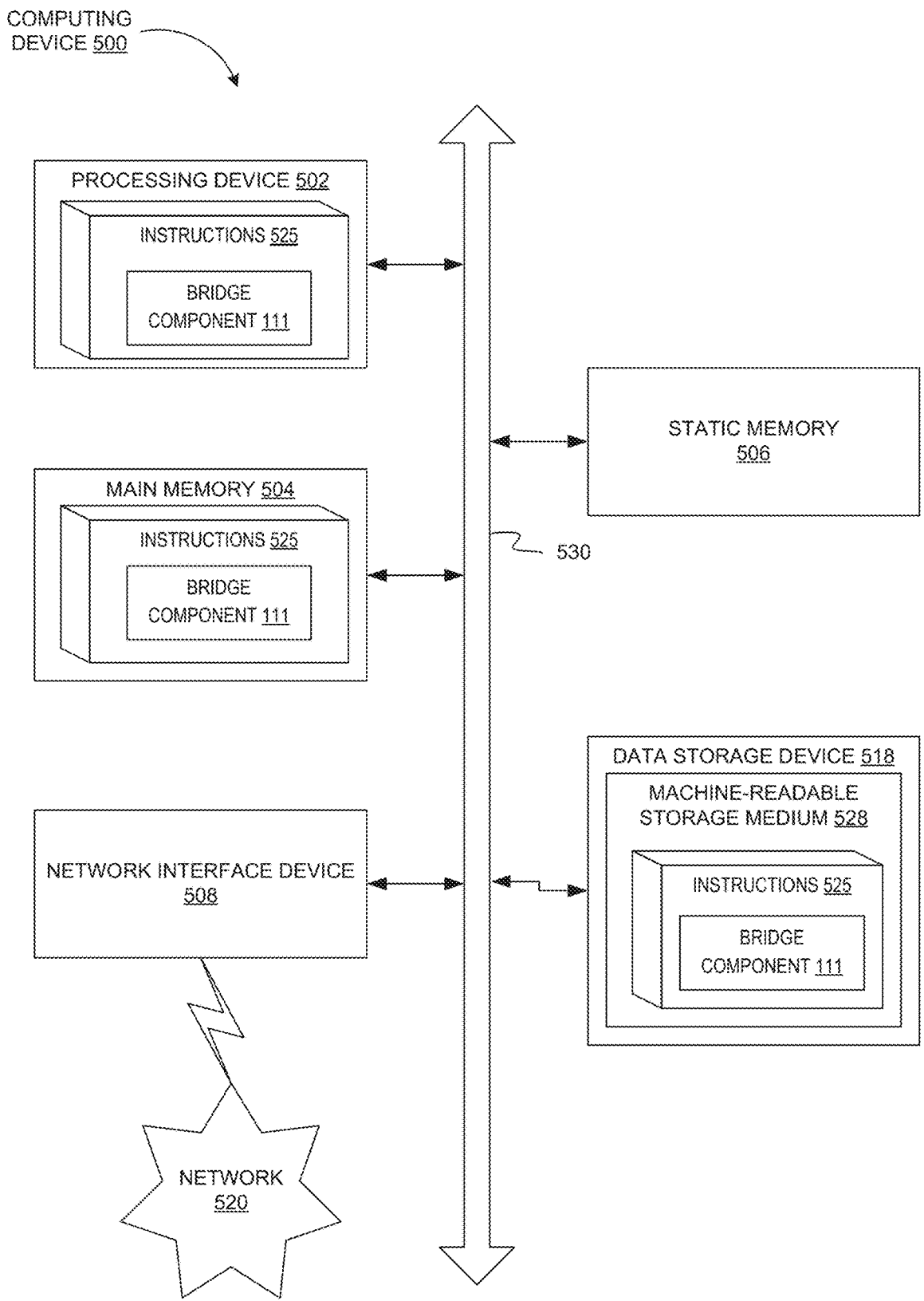
FIG. 5 is a block diagram of an example apparatus that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. Data storage device 518 may include a computer-readable storage medium 528 on which may be stored one or more sets of instructions 525 that may include instructions for a bridge component (e.g., bridge component 111, 121, 131, etc., illustrated in FIG. 1), for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "reading," "routing," "updating," "connecting," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:
1. A method, comprising:
   establishing a communication bridge between a first application and a second application via a first bridge component and a second bridge component,
   wherein:
     the first application is located within a first computing device and the second application is located within a second computing device;
     the communication bridge comprises a set of communication channels between the first computing device and the second computing device; and
     each communication channel of the set of communication channels is associated with an application programing interface (API) function of the first application;
   receiving, at the first bridge component from the second application via a first communication channel of the communication bridge, a first request for the first application to perform a first operation;
   identifying, by the first component, a first API function of the first application based on an association between the first communication channel and the first API function of the first application;
   executing by the first bridge component, the first API function to cause the first application to perform the first operation;

receiving, at the first bridge component, a first result of the first operation from the first application; and providing, by the first bridge component, the first result of the first operation to the second application via the second bridge component.

2. The method of claim 1, wherein:
the first computing device is within a first computing environment; and
the second computing device is not located within the first computing environment.

3. The method of claim 1, wherein the second computing device is unable to execute the first application.

4. The method of claim 1, wherein the first application communicates with a server to perform the first operation.

5. The method of claim 4, wherein the second application does not communicate with the server.

6. The method of claim 1, wherein:
the second computing device comprises a mobile computing device.

7. The method of claim 1, further comprising:
establishing the communication bridge between the first application and the second application based on an authentication process.

8. The method of claim 1, further comprising:
establishing a second communication bridge between the first application and a third application, wherein:
the third application is located within a third computing device;
the second communication bridge comprises a second set of communication channels; and
each communication channel of the second set of communication channels is associated with an application programing interface (API) function of the first application;
receiving, from the third application via a second communication channel of the second communication bridge, a second request for the first application to perform a second operation;
providing the second request to the first application;
receiving a second result of the second operation from the first application; and
providing the second result of the second operation to the third application.

9. The method of claim 1, further comprising:
receiving, from the second application via a second communication channel of the communication bridge, a second request for the first application to perform a second operation;
providing the second request to the first application;
receiving a second result of the second operation from the first application; and
providing the second result of the second operation to the second application.

10. The method of claim 1, further comprising establishing the communication bridge between the first application and the second application based on a link included in a message communicated between the first bridge component and the second bridge component.

11. A method, comprising:
establishing a communication bridge between a first application and a second application via a first bridge component and a second bridge component, wherein:
the first application is located within a first computing device and the second application is located within a second computing device;
the communication bridge comprises a set of communication channels between the first computing device and the second device; and
each communication channel of the set of communication channels is associated with an application programing interface (API) function of the first application;
determining, at the second bridge component, that the second application is requesting the first application to perform a first operation;
identifying, by the second bridge component, a first communication channel of the set of communication channels based on an association between the first communication channel and operation;
transmitting, by the second bridge component, a first request to the first application to perform the first operation via the first communication channel of the communication bridge; and
receiving, at the second bridge component, a first result of the first operation from the first application via the communication bridge.

12. The method of claim 11, wherein:
the first computing device is within a first computing environment; and
the second computing device is not located within the first computing environment.

13. The method of claim 11, wherein the second computing device is unable to execute the first application.

14. The method of claim 11, wherein the first application communicates with a server to perform the first operation.

15. The method of claim 14, wherein the second application does not communicate with the server.

16. The method of claim 11, further comprising:
establishing the communication bridge between the first application and the second application based on an authentication process.

17. The method of claim 11, further comprising:
establishing a second communication bridge between a first application and a third application, wherein:
the first application is located within a first computing device and the third application is located within a third computing device;
the second communication bridge comprises a second set of communication channels; and
each communication channel of the second set of communication channels is associated with an application programing interface (API) function of the third application;
determining that the second application is requesting the third application to perform a second operation;
transmitting a second request to the third application via a second communication channel of the second communication bridge; and
receiving a second result of the second operation from the third application via the second communication bridge.

18. The method of claim 11, further comprising:
determining that the second application is requesting the first application to perform a second operation;
transmitting a second request to the second application via a second communication channel of the communication bridge; and
receiving a second result of the second operation from the second application via the communication bridge.

19. A non-transitory computer-readable storage medium having instructions stored thereon that, when executed by a processing device, cause the processing device to perform operations comprising:

establishing a communication bridge between a first application and a second application via a first bridge component and a second bridge component, wherein:
   the first application is located within a first computing device and the second application is located within a second computing device;
   the communication bridge comprises a set of communication channels between the first computing device and the second computing device; and
   each communication channel of the set of communication channels is associated with an application programing interface (API) function of the first application;
receiving, at the first bridge component from the second application via a first communication channel of the communication bridge, a first request for the first application to perform a first operation;
identifying, by the first bridge component, a first API function of the first application based on an association between the first communication channel and the first API function of the first application;
executing by the first bridge component, the first API function to cause the first application to perform the first operation;
receiving, at the first bridge component, a first result of the first operation from the first application; and
providing, by the first bridge component, the first result of the first operation to the second application via the second bridge component.

20. The method of claim 11, further comprising establishing the communication bridge between the first application and the second application based on a link included in a message communicated between the first bridge component and the second bridge component.

* * * * *